United States Patent
Zelina et al.

(10) Patent No.: US 12,169,068 B2
(45) Date of Patent: Dec. 17, 2024

(54) COMBUSTOR FOR A TURBINE ENGINE

(71) Applicant: General Electric Company, Schenectady, NY (US)

(72) Inventors: Joseph Zelina, Waynesville, OH (US); Shai Birmaher, Cincinnati, OH (US); Sibtosh Pal, Mason, OH (US); Clayton S. Cooper, Loveland, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 17/819,399

(22) Filed: Aug. 12, 2022

(65) Prior Publication Data
US 2024/0053013 A1 Feb. 15, 2024

(51) Int. Cl.
F23R 3/00 (2006.01)
F23R 3/28 (2006.01)

(52) U.S. Cl.
CPC .................... F23R 3/286 (2013.01)

(58) Field of Classification Search
None
See application file for complete search history.

(56) References Cited

U.S. PATENT DOCUMENTS

| | | | |
|---|---|---|---|
| 3,693,347 A | 9/1972 | Kydd et al. | |
| 4,160,362 A | 7/1979 | Martens et al. | |
| 4,259,837 A | 4/1981 | Russell et al. | |
| 4,928,478 A | 5/1990 | Maslak | |
| 9,732,672 B2 | 8/2017 | Ewens et al. | |
| 9,790,865 B2 | 10/2017 | Davis, Jr. et al. | |
| 2007/0089425 A1* | 4/2007 | Motter | F23L 7/002 60/39.3 |
| 2015/0344144 A1* | 12/2015 | Kamath | F02C 7/236 244/135 C |
| 2016/0273449 A1* | 9/2016 | DiCintio | F23D 11/16 |
| 2017/0003032 A1* | 1/2017 | Jorgensen | F23R 3/14 |
| 2018/0363556 A1* | 12/2018 | Kim | F23R 3/28 |
| 2020/0385133 A1* | 12/2020 | Ruhan | F02C 9/32 |

FOREIGN PATENT DOCUMENTS

| | | |
|---|---|---|
| CA | 3142100 A1 | 12/2020 |
| GB | 2497778 A | 6/2013 |

OTHER PUBLICATIONS

Daggett, David L., Water Injection Feasibility for Boeing 747 Aircraft, NASA Contractor Report (CR), NASA/CR-2005-213656, Dec. 1, 2005.

* cited by examiner

*Primary Examiner* — Katheryn A Malatek
(74) *Attorney, Agent, or Firm* — Venable LLP; Peter T. Hrubiec; Michele V. Frank

(57) ABSTRACT

A combustor for a turbine engine. The combustor includes a fuel injector and a fluid injection system in fluid communication with the combustor. The fuel injector includes a mixer assembly with a pilot mixer and a main mixer. The pilot mixer and the main mixer operate during high power operation of the turbine engine. The fluid injection system injects a fluid into the combustor during high power operation of the turbine engine. The fluid is shut off during low power operation of the turbine engine and during mid-level power operation of the turbine engine.

16 Claims, 4 Drawing Sheets

COMBUSTOR FOR A TURBINE ENGINE

TECHNICAL FIELD

The present disclosure relates generally to combustors for turbine engines.

BACKGROUND

A turbine engine generally includes a fan and a core section arranged in flow communication with one another. A combustor is arranged in the core section to generate combustion gases for driving a turbine of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
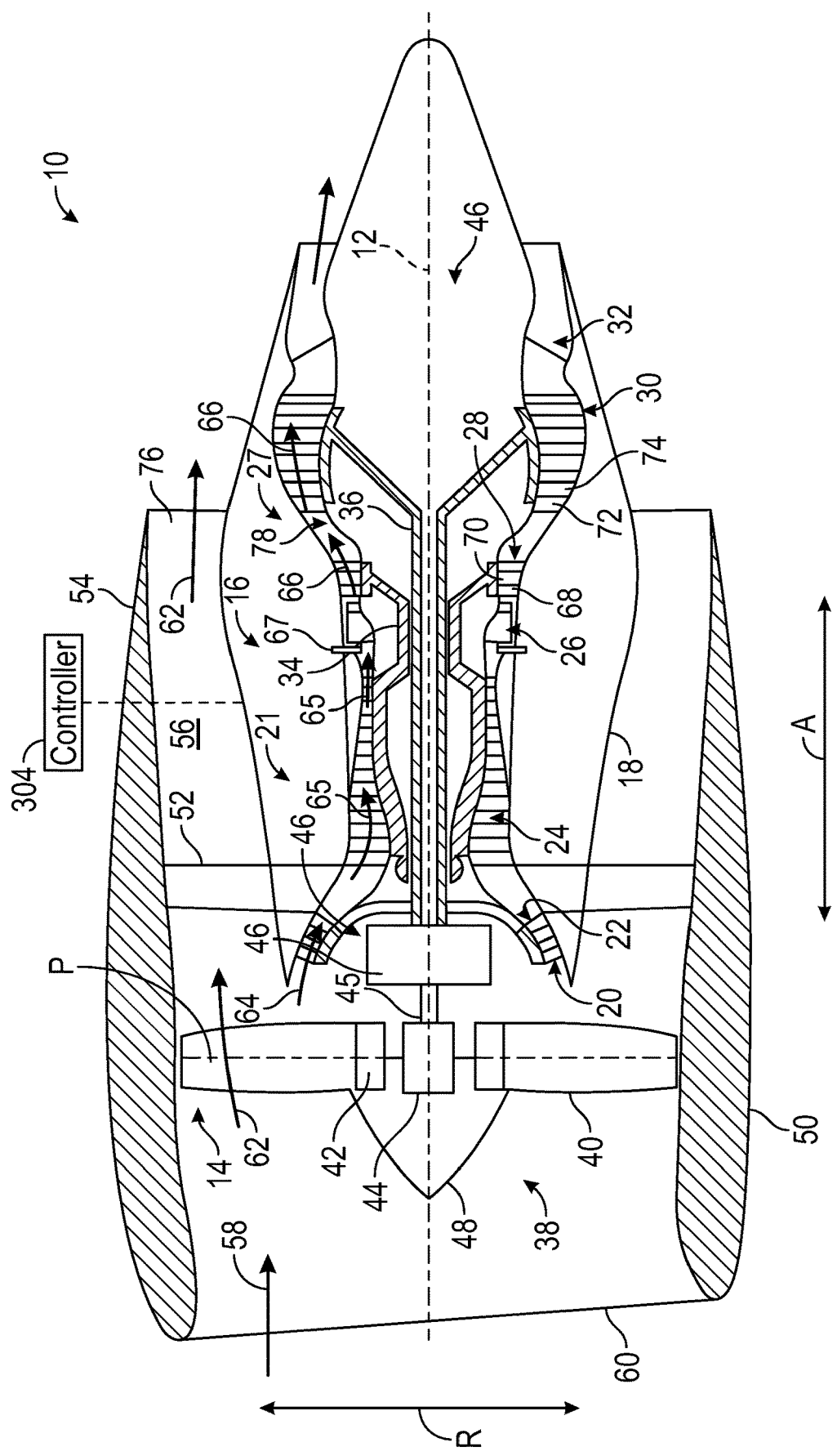
FIG. 1 is a schematic cross-sectional diagram of a turbine engine, taken along a centerline axis of the turbine engine, according to the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Combustors for turbine engines, such as turbine engines for aircraft, ignite fuel and air mixtures to produce combustion gases, which in turn drive one or more turbines of the turbine engine, thereby rotating one or more loads (e.g., a fan, a propeller, etc.). Air pollution concerns have led to stricter combustion emissions standards. Such standards regulate the emission of nitrogen oxide ($NO_x$), non-volatile particulate matter (nvPM), as well as other types of exhaust emissions, from the turbine engine. The nvPM includes, for example, soot, smoke, or the like. Generally, $NO_x$ is formed during the combustion process due to high flame temperatures in the combustor. Turbine engine design tradeoffs are necessary to meet requirements for noise, emissions, fuel burn, cost, weight, and performance. One approach to achieve greater fuel efficiency is to increase the overall pressure ratio (OPR) of the turbine engine. The OPR is a ratio of the pressure at an upstream end (e.g., an inlet) of the compressor of the turbine engine and the pressure at a downstream end (e.g., an outlet) of the compressor. Higher OPRs, however, raise the combustion gas temperature and increase NO generation due to higher temperatures in the combustor. In turbine engine design, balancing a reduction in $NO_x$ emissions, nvPM emissions, $CO_2$, and noise, while achieving improved engine performance, is difficult. For example, combustor design changes to achieve lower emissions must not impact the ability of the combustion system to satisfy performance and certification requirements throughout the operating cycle of the aircraft.

Variations of two combustor architectures are used in turbine engine design to balance operational and environmental requirements: a rich-quench lean (RQL) combustor and a lean burn combustor. The RQL combustor operates as fuel-rich (e.g., excess fuel) mixture in a front-end primary zone that is directly downstream of the fuel injector and the swirler and provides flame stability over the range of combustor operation. As the fuel-rich mixture moves axially in the combustor, air jets are used to help close the primary zone recirculation zone and to provide additional air to continue reactions and also to quench the combustion gas to a lean mixture to reduce NO emissions and reduce the highest temperature before the mixture exits the combustor. For example, the additional air from the air jets increases the amount of air in the fuel-air mixture changing the mixture from fuel-rich to fuel lean. RQL combustors produce great amounts of soot in the fuel-rich primary zone, but NO is reduced due to temperatures being low for fuel-rich mixtures. A rapid RQL quench zone design is needed in RQL combustors to balance a reduction of combustor hot spots and time at a temperature at which NO is formed, while providing adequate temperature and time to burn out the soot and the nvPM formed in the primary zone.

Lean burn combustors avoid the high NO formation zone resulting from high temperatures by starting lean and remaining lean at higher power outputs of the turbine engine. A small, fuel-rich flame, referred to as a pilot flame, is used that operates with a lower percentage of the total fuel and stabilizes the flame when in lean burning mode. The pilot provides all of the fuel during low and part-power operation to maintain improved combustion efficiencies, and a main fuel circuit is opened to produce a main flame for higher power operation or mid-level power operation. Thus, the flame during the mid-level power operation and/or during the higher power operation includes the pilot flame and the main flame. A lean burn design provides all of the mixing in the front-end (e.g., the upstream end) of the combustor which helps to reduce nvPM emissions by remaining fuel lean and avoiding large combustor volumes of fuel-rich, high nvPM-producing zones in the combustor. When operating on pilot only flow at lower powers, the lean burn combustor produces non-zero nvPM as the pilot rich flame is quenched by the main air flow, similar to the RQL combustor.

As detailed above, there are tradeoffs in balancing $NO_x$ emissions, nvPM emissions, and carbon monoxide (CO) and unburned hydrocarbon (UHC) emissions in the combustion chamber. NO is produced at high engine power levels, and the NO is produced in the post-flame region of the combustion chamber, is temperature driven, and is time at temperature driven. For example, a greater amount of $NO_x$ is produced at higher temperatures and longer times at temperature. Current turbine engines control $NO_x$ emissions by reducing peak combustor temperatures and combustor residence time at those high temperatures. Reducing combustor residence time and combustor volume and length have the added benefit of reduced engine weight. For short combustor residence times and low combustion temperatures where NO formation is low, however, CO and UHC emissions are higher due to incomplete combustion, and the combustor liner cooling air during low power ground operations can quench reactions of CO and UHC. Fuel-rich zones in the combustor form nvPM emissions, and increased time (combustor volume) is needed to oxidize the nvPM before being quenched in the downstream cooler region of the engine after exiting the combustor. Therefore, to balance all emissions requirements, turbine engine designs need an improved fuel and air placement in the dome region, an improved stoichiometry in the combustor, and improved residence time. Some turbine engines utilize leaner mixtures or changes in fuel spray at the upstream end of the combustor to reduce nvPM emissions. Such turbine engines, however, reduce operability and increase NO emissions.

Embodiments of the present disclosure provide systems and methods to balance the requirements in turbine engines of low fuel burn and carbon dioxide ($CO_2$) emissions that are achieved with high overall pressure ratios and combustor fuel-air ratios, and other pollutant emissions, such as $NO_x$ emissions, that increase with temperature increases and pressure increases. Such reduction in the various types of emissions is difficult to achieve when fuel burn and emissions need to be reduced over an entirety of a mission cycle of the turbine engine of an aircraft. The mission cycle includes low power operation, mid-level power operation, and high power operation. Low power operation includes, for example, engine start, idle, taxiing, and descent. Mid-level power operation includes, for example, cruise. High power operation includes, for example, takeoff and climb. Embodiments of the present disclosure utilize water injection or steam injection into the combustor to reduce $NO_x$ emissions, while also utilizing a lean burn staged combustion system that can provide low fuel burn and low emissions across the entire mission cycle of the turbine engine.

The various power levels of the turbine engine are defined as a percentage of a sea level static (SLS) maximum engine rated thrust. Low power operation includes, for example, less than thirty percent (30%) of the SLS maximum engine rated thrust of the turbine engine. Mid-level power operation includes, for example, thirty percent (30%) to eighty-five (85%) of the SLS maximum engine rated thrust of the turbine engine. High power operation includes, for example, greater than eighty-five percent (85%) of the SLS maximum engine rated thrust of the turbine engine. The values of the thrust for each of the low power operation, the mid-level power operation, and the high power operation of the turbine engine are exemplary only, and other values of the thrust can be used to define the low power operation, the mid-level power operation, and the high power operation.

The method disclosed herein injects water or steam into the combustor at takeoff and climb power settings (e.g., a high power operation) to reduce overall $NO_x$ emissions during the landing and takeoff (LTO) portion of the mission cycle. Once the turbine engine is throttled back to mid-level power operation or to low power operation, the water or steam injection is turned off and the system operates in a fuel staging mode for the remainder of the mission cycle. The water or steam injection reduces $NO_x$ emissions near the ground, and fuel staging reduces both $NO_x$ emissions and nvPM emissions at cruise and other mid-level power operation or low power operation. The water can be stored aboard the turbine engine or the aircraft. For example, a water tank aboard can store eleven to thirty (11 to 30) gallons per engine. The water can be recycled, captured in exhaust, or from the environment (e.g., metal organics) on the climb and descent legs of the mission cycle. Engine waste heat and/or heated fuel can be used to convert water to steam for steam injection.

In rich burn combustors, $NO_x$ emissions are not strongly driven by the fuel-air ratio. Further, nvPM emissions can be higher than lean burn combustors because the rich burn combustors do not have a fuel staging capability (e.g., a main flame and a pilot flame). For lean burn combustors, achieving low emissions is highly dependent on the fuel-air ratio and the ability to reduce pilot fuel flow. Low nvPM and low NO at cruise is achieved with fuel staging of the pilot flame. Accordingly, embodiments of the present disclosure provide for water or steam injection during aircraft takeoff and climb phases at high OPR, high temperature, and high fuel-air ratios, thus reducing LTO $NO_x$ emissions (e.g., local air quality). Further, the nvPM emissions are low over the LTO due to fuel staging (e.g., fuel split between the main flame and the pilot flame). Water or steam injection can occur in a separate spray bar or a separate manifold, upstream of the combustor dome, or in the main swirler passages of the mixer assembly. Water or steam is turned off at predetermined thrust settings or at predetermined altitudes and the combustor is operated fuel-staged while reducing the pilot split to achieve a balance between reduced $NO_x$ emissions and reduced nvPM emissions at cruise. The turbine engine of the present disclosure reduces fuel burn and $CO_2$ by operating at higher OPR, higher temperature, and higher fuel-air ratios. Operating the turbine engine in such a way, however, produces higher $NO_x$ emissions and higher nvPM emissions. A lean burn combustor can balance the reduction of $NO_x$ emissions and the reduction of nvPM emissions, as detailed above. Lean burn combustors, however, require lower fuel-air ratio (e.g., lower thermal efficiency) engines to achieve the benefits detailed above. Accordingly, the water or steam injection provides lower emissions during the higher OPR, higher temperature, higher fuel-air ratio operations, and the fuel staging of the lean burn combustor is used for the remainder of the mission cycle without the need for water or steam injection to suppress NO formation. The embodiments of the present disclosure provide for improving air flow splits and fuel flow splits between the main mixer and the pilot mixer, while allowing for reduced fuel burn, reduced $NO_x$ emissions, reduced nvPM emissions, and operating at higher OPRs and fuel-air ratios over an entirety of the mission cycle for the turbine engine.

Referring now to the drawings, FIG. 1 is a schematic cross-sectional diagram of a turbine engine 10, taken along a centerline axis of the turbine engine 10, according to an embodiment of the present disclosure. As shown in FIG. 1, the turbine engine 10 defines an axial direction A (extending parallel to a longitudinal, centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased, forming compressed air 65, and the compressed air 65 is routed through the HP compressor 24 and into the combustion section 26, where the compressed air 65 is mixed with fuel 67 and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, and/or turboshaft engines.

A controller 304 is in communication with the turbine engine 10 for controlling aspects of the turbine engine 10. For example, the controller 304 is in two-way communication with the turbine engine 10 for receiving signals from various sensors and control systems of the turbine engine 10 and for controlling components of the turbine engine 10, as detailed further below. The controller 304, or components thereof, may be located onboard the turbine engine 10, onboard the aircraft, or can be located remote from each of the turbine engine 10 and the aircraft.

Figure 2:
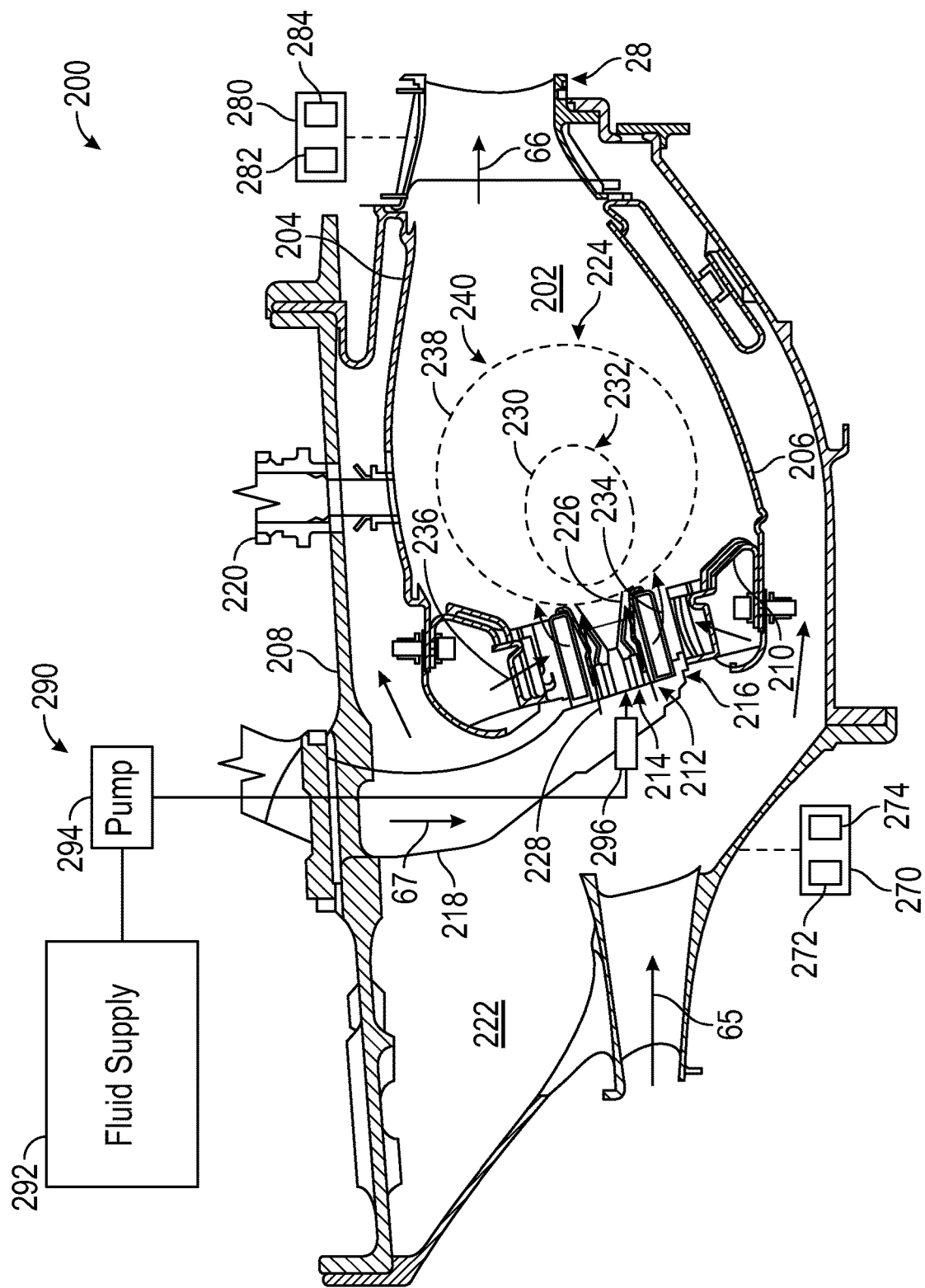
FIG. 2 is a schematic cross-sectional diagram of a combustor of the turbine engine of FIG. 1, taken along a centerline axis of the turbine engine, according to the present disclosure.

FIG. 2 is a schematic cross-sectional diagram of a combustor 200 that can be used with the turbine engine 10 (FIG. 1), taken along a centerline axis of the turbine engine 10 (FIG. 1). In the exemplary embodiment, the combustion section 26 (FIG. 1) includes a combustor 200 having a combustion chamber 202 defined by an outer liner 204 and an inner liner 206. The outer liner 204 and the inner liner 206 are annular about the centerline axis 12 of the turbine engine 10 (FIG. 1). The outer liner 204 defines a radially outer boundary of the combustion chamber 202, and the inner liner 206 defines a radially inner boundary of the combustion chamber 202. The outer liner 204 and the inner liner 206 are spaced radially inward from an annular combustor casing 208 that extends circumferentially about the outer liner 204 and the inner liner 206. The combustor 200 also includes an annular dome 210 mounted upstream from the outer liner 204 and the inner liner 206. The annular dome 210 defines an upstream end of the combustion chamber 202.

A plurality of mixer assemblies 212 (only one is illustrated in FIG. 2) are spaced circumferentially about the annular dome 210 to deliver a mixture of fuel and air to the combustion chamber 202. In FIG. 2, each mixer assembly 212 is a twin annular premixing swirler (TAPS) that includes a pilot mixer 214 and a main mixer 216. The main mixer 216 is concentrically aligned with respect to the pilot mixer 214 and extends circumferentially about the pilot mixer 214. A plurality of circumferentially spaced and axially extending fuel injectors 218 (only one is illustrated in FIG. 2) are coupled in flow communication with each respective mixer assembly 212. Downstream of the mixer assembly 212 is an igniter 220 that extends through the annular combustor casing 208 and into the combustion chamber 202 to provide initial ignition of the mixture of compressed air 65 and fuel 67. In various embodiments, the igniter 220 can provide continuous or intermittent ignition support to the combustion chamber 202.

In operation, the combustor 200 receives compressed air 65 discharged from the HP compressor 24 (FIG. 1) in a diffuser section 222 at a location upstream of the combustion chamber 202. A portion of the compressed air 65 is channeled through the mixer assembly 212. At the mixer assembly 212, the compressed air 65 is mixed with the fuel 67 from the fuel injector 218 and discharged into the combustion chamber 202. The mixture of compressed air 65 and fuel 67 is ignited by igniter 220 creating a flame 224 within the combustion chamber 202 that burns the mixture and provides combustion gases 66 that are channeled downstream to a first stage turbine nozzle of the HP turbine 28. The combustor 200 is a lean burn combustor. Specifically, at engine start conditions and at engine low power operation (e.g., less than 30% of SLS maximum engine rated thrust) of the turbine engine 10 (FIG. 1), such as at idle, at taxi, or at descent, the combustor 200 uses only fuel 67 provided to the pilot mixer 214 for generating combustion gases 66. At the pilot mixer 214, fuel 67 includes a pilot fuel stream 226 that is mixed with a first portion 228 of the compressed air 65 to provide a rich fuel-air mixture (e.g., higher fuel to air ratios within the mixture) that is ignited for a pilot flame 230 within a region 232 that is adjacent to the pilot mixer 214. At high power operation (e.g., greater than 85% of SLS maximum engine rated thrust) of the turbine engine 10 (FIG. 1), such as at takeoff or at climb, and at mid-level power operation (e.g., 30% to 85% of SLS maximum engine rated thrust) of the turbine engine 10 (FIG. 1), such as at cruise, the combustor 200 uses a fuel 67 split between the pilot mixer 214 and the main mixer 216 for generating the combustion gases 66. At the main mixer 216, the fuel 67 includes a main fuel stream 234 that is mixed with a second portion 236 of the compressed air 65 to provide a lean fuel-air mixture (e.g., lower fuel to air ratios within the mixture) that is ignited for a main flame 238 within a region 240 that is adjacent to the main mixer 216, thus, providing a lean burn combustion process to generate combustion gases 66 while reducing $NO_x$ emissions by operating fuel lean, as detailed further below. Further, the lean burn combustion process provides for low non-volatile particulate matter (nvPM), such as soot or smoke, and reduces $NO_x$ emissions.

The combustor 200 also includes one or more first sensors 270 positioned upstream of the combustion chamber 202 and one or more second sensors 280 positioned downstream of the combustion chamber 202. The one or more first sensors 270 sense operating conditions at the inlet (e.g., inlet operating conditions) of the combustor 200 (e.g., operating conditions of the compressed air 65 entering the combustor 200) and the one or more second sensors 280 sense operating conditions at the outlet (e.g., outlet operating conditions) of the combustor 200 (e.g., operating conditions of the combustion gases 66 exiting the combustor 200). The one or more first sensors 270 are positioned to sense conditions of the compressed air 65 flowing from the HP compressor 24 (FIG. 1) into the combustor 200. For example, the one or more first sensors 270 include a first pressure sensor 272 for sensing a pressure of the compressed air 65 entering the combustor 200 and a first temperature sensor 274 for sensing a temperature of the compressed air 65 entering the combustor 200. The one or more second sensors 280 are positioned to sense conditions of the combustion gases 66 flowing out of the combustor 200 and into the HP turbine 28. For example, the one or more second sensors 280 include a second pressure sensor 282 for sensing a pressure of the combustion gases 66 exiting the combustor 200 and a second temperature sensor 284 for sensing a temperature of the combustion gases 66 exiting the combustor 200. The one or more first sensors 270 and the one or more second sensors 280 can include any type of sensor or virtual sensor for sensing pressure and temperature and indicating values indicative of pressure and temperature. The one or more first sensors 270 and the one or more second sensors 280 convert the sensed pressures and the sensed temperatures into electrical signals and send the electrical signals to a controller, as detailed further below.

Generally, the pilot flame 230 burns at a higher temperature than the main flame 238 because the fuel-air mixtures are richer (e.g., more fuel). Further, certain turbine engines operate with higher fuel-air ratios to increase thermal efficiency—a ratio of the net work output to the heat input, as well as higher overall pressure ratios to reduce fuel burn.

Operating the turbine engine at higher fuel-air ratios and higher overall pressure ratios increases the temperature of the pilot flame 230 and of the main flame 238, thereby increasing $NO_x$ emissions and increasing nvPM emissions as compared to turbine engines with lower fuel-air ratios and lower overall pressure ratios. Thus, the benefits of the lean burn combustion process during high power conditions (e.g., takeoff and climb) detailed above are reduced. Accordingly, the present disclosure provides a system and a method for reducing the $NO_x$ emissions and the nvPM emissions over an entirety of a mission cycle (e.g., idle, taxiing, takeoff, climb, cruise, descent, and landing) of the turbine engine 10 (FIG. 1).

The turbine engine 10 (FIG. 1) includes a fluid injection system 290 (shown schematically in FIG. 2) for injecting a fluid, such as, water and/or steam, into the combustor 200. The fluid injection system 290 is in fluid communication with the combustor 200 to inject fluid into the combustor 200. The fluid of the fluid injection system 290 can include water, steam, and/or any type of fluid for reducing a temperature of the pilot flame 230, of the main flame 238, or of both the pilot flame 230 and the main flame 238. The fluid injection system 290 includes a fluid supply 292, a pump 294, and a fluid injector 296. The fluid supply 292 includes a tank, such a water tank, or the like. In this way, the fluid (e.g., water) is stored in the tank onboard the aircraft or aboard the turbine engine 10 (FIG. 1). For example, eleven to thirty gallons (11 to 30 gallons) can be stored in the tank. In some embodiments, the fluid supply 292 includes recycled fluid (e.g., water) routed through the turbine engine 10 (FIG. 1), fluid captured in exhaust of the turbine engine 10 (FIG. 1), or fluid from the environment (e.g., metal organics) on the climb leg and the descent leg of a respective mission. In some embodiments, engine waste heat and/or heated fuel is used to convert water to steam for steam injection.

The pump 294 includes any type of pump for pumping the fluid from the fluid supply 292 through the fluid injector 296 and into the combustion chamber 202. The fluid injector 296 includes any type of injector for injecting fluid, such as water and/or steam. For example, the fluid injector 296 includes a spray bar or a manifold for injecting the fluid upstream of the annular dome 210 such that the fluid is directed into the mixer assembly 212. In some embodiments, the fluid injector 296 is located directly within the swirler passages (e.g., within the pilot mixer 214 and/or within the main mixer 216) of the mixer assembly 212. The fluid injector 296 can be located anywhere upstream of the combustion chamber 202 for injecting fluid into the combustion chamber 202 to reduce the temperature of the flame 224, thereby reducing the $NO_x$ emissions and the nvPM emissions.

Figure 3:
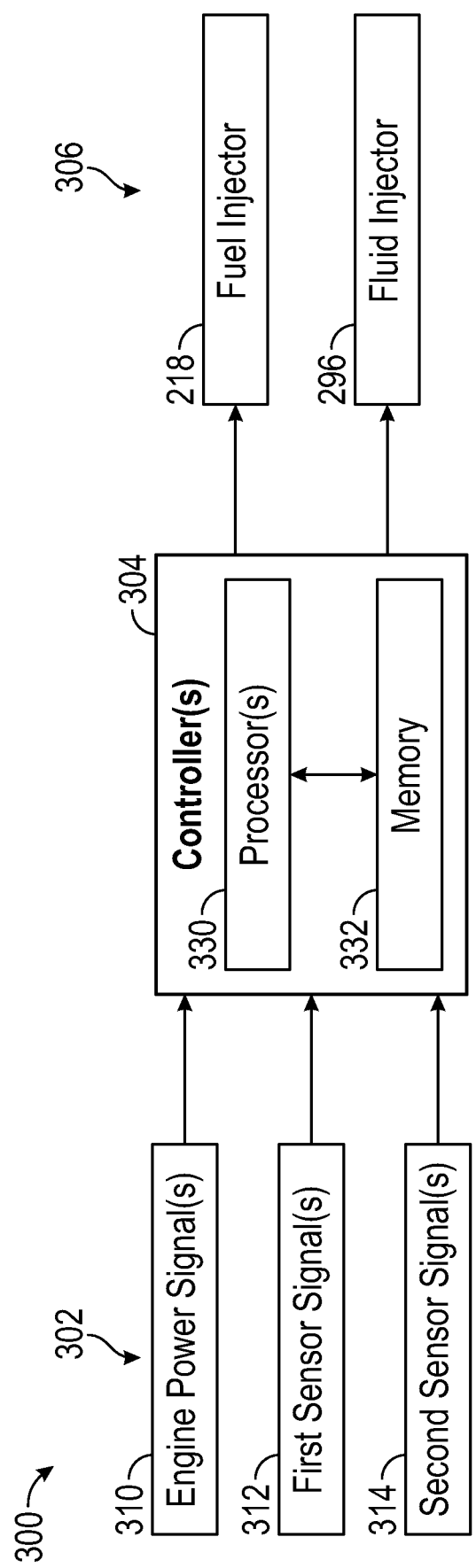
FIG. 3 is a schematic view of a fluid injection control system for operation and control of at least portions of the turbine engine of FIG. 1, according to the present disclosure.

FIG. 3 is a schematic view of a fluid injection control system 300 for operation and control of at least portions of the turbine engine 10 (FIG. 1), according to the present disclosure. The fluid injection control system 300 includes inputs 302, the controller 304, and outputs 306. The inputs 302 include one or more engine power signals 310 from the turbine engine 10 (FIG. 1), one or more first sensor signals 312 from the one or more first sensors 270 (FIG. 2), and one or more second sensor signals 314 from the one or more second sensors 280 (FIG. 2). The one or more engine power signals 310 are indicative of a power level of the turbine engine 10. The power level is a function of the torque produced by the turbine and the rotational speed of the turbine. In some embodiments, the power level is a function of the amount of thrust produced by the turbine engine. For example, during takeoff and climb conditions, the turbine engine 10 (FIG. 1) operates at high power operation (e.g., greater than 85% of SLS maximum engine rated thrust), during cruise, the turbine engine 10 (FIG. 1) operates at mid-level power operation (e.g., 30% to 85% of SLS maximum engine rated thrust), and during idle, taxiing, and descent, the turbine engine 10 (FIG. 1) operates at low power operation (e.g., less than 30% of SLS maximum engine rated thrust). The power output from the turbine section 27 corresponds to the temperature of the combustion gases 66 (FIG. 2) exiting the combustor 200 (FIG. 2) and entering the HP turbine 28 (FIG. 2), as sensed by the second temperature sensor 284 (FIG. 2). Higher temperatures of the combustion gases 66 indicate higher power output, mid-level temperatures of the combustion gases 66 indicate mid-level power output, and lower temperatures of the combustion gases 66 indicate lower power output.

The one or more first sensor signals 312 and the one or more second sensor signals 314 include electrical signals indicative of the operating conditions at the inlet of the combustor 200 (FIG. 2) and at the outlet of the combustor 200 (FIG. 2), respectively. For example, the one or more first sensor signals 312 include electrical signals indicative of the pressure at the inlet of the combustor 200 from the first pressure sensor 272 (FIG. 2) and/or include electrical signals indicative of the temperature at the inlet of the combustor 200 (FIG. 2) from the first temperature sensor 274 (FIG. 2). The one or more second sensor signals 314 include electrical signals indicative of the pressure at the outlet of the combustor 200 from the second pressure sensor 282 (FIG. 2) and/or include electrical signals indicative of the temperature at the outlet of the combustor 200 (FIG. 2) from the second temperature sensor 284 (FIG. 2). The outputs 306 include control of the fuel injector 218 and control of the fluid injector 296. The controller 304 receives the inputs 302, implements a method of operating a combustor, and controls the outputs 306, as described with reference to FIG. 4 below.

The controller 304 may be a standalone controller or may be part of an engine controller to operate various systems of the turbine engine 10 (FIG. 1). In this embodiment, the controller 304 is a computing device having one or more processors 330 and a memory 332. The one or more processors 330 can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory 332 can include one or more computer-readable media, including, but not limited to, non-transitory computer-readable media, a computer readable non-volatile medium (e.g., a flash memory), a RAM, a ROM, hard drives, flash drives, or other memory devices.

The memory 332 can store information accessible by the one or more processors 330, including computer-readable instructions that can be executed by the one or more processors 330. The instructions can be any set of instructions or a sequence of instructions that, when executed by the one or more processors 330, cause the one or more processors 330 and the controller 304 to perform operations. The controller 304 and, more specifically, the one or more processors 330 are programmed or configured to perform these operations, such as the operations discussed further below. In some embodiments, the instructions can be executed by the one or more processors 330 to cause the one or more processors 330 to complete any of the operations and functions for which the controller 304 is configured, as will be described further below. The instructions can be software written in any suitable programming language or can be implemented in hardware. Additionally, or alternatively, the instructions can be executed in logically or virtually separate threads on the processors 330. The memory 332 can further store data that can be accessed by the one or more processors 330.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The controller 304 is communicatively coupled to the one or more first sensors 270 (FIG. 2), the one or more second sensors 280 (FIG. 2), the fuel injectors 218 (FIG. 2), and the fluid injector 296 (FIG. 2). The controller 304 receives the inputs 302 and controls the outputs 306, as detailed further below.

Figure 4:
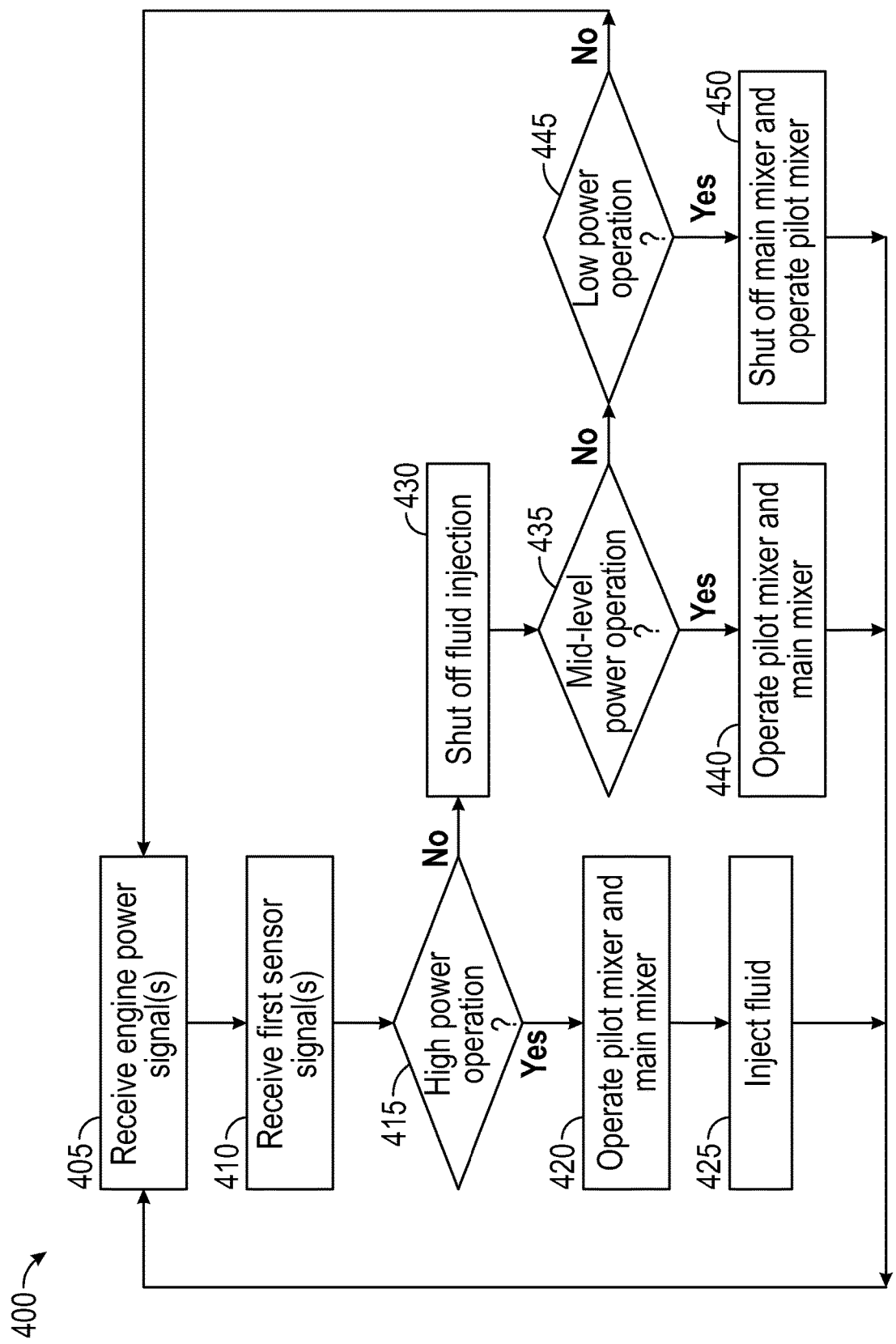
FIG. 4 is a flowchart depicting an exemplary method of operating the combustor of FIG. 2, according to the present disclosure.

FIG. 4 is a flowchart depicting an exemplary method 400 of operating a combustor for a turbine engine, according to the present disclosure. The method 400 is performed after engine start while the turbine engine 10 is operating. For example, with reference to FIG. 2, at engine start, only the pilot mixer 214 receives fuel 67 to generate a pilot fuel stream 226 that is mixed with the first portion 228 of the compressed air 65 to provide a rich fuel-air mixture that is ignited to generate the pilot flame 230 within the region 232. Thus, the method 400 proceeds after the engine start and the pilot flame 230 has been generated.

For the method 400, reference is made to FIGS. 2 and 3. In step 405, the controller 304 receives the one or more engine power signals 310. From the one or more engine power signals 310, the controller 304 determines a power level setting for the turbine engine 10 (FIG. 1). For example, the controller 304 determines that the turbine engine 10 is operating at low power operation (e.g., less than 30% of SLS maximum engine rated thrust), is operating at mid-level power operation (e.g., 30% to 85% of SLS maximum engine rated thrust), or is operating at high power operation (e.g., greater than 85% of SLS maximum engine rated thrust), as detailed further below. In step 410, the controller 304 receives the one or more first sensor signals 312. For example, the controller 304 receives the one or more first sensor signals 312 from the one or more first sensors 270. The one or more first sensor signals 312 indicate a pressure and/or a temperature at the inlet of the combustor 200 (e.g., a pressure and/or a temperature of the compressed air 65 entering the combustor 200). For example, the controller 304 determines whether the pressure is a high pressure, a mid-level pressure, or a low pressure and whether the temperature is a high temperature, a mid-level temperature, or a low temperature. The controller 304 can also determine a fuel-air ratio in the mixer assembly 212.

In step 415, the controller 304 determines whether the turbine engine 10 (FIG. 1) is in high power operation based on the power, on the pressure, on the temperature, and/or on the fuel-air ratio. High power operation, high pressures, high temperatures, and high fuel-air ratios indicate a takeoff condition and/or a climb condition of the mission cycle of the turbine engine 10 (FIG. 1).

In step 420, if the turbine engine 10 (FIG. 1) is in high power operation (step 415: Yes), the controller 304 operates the pilot mixer 214 and the main mixer 216. At high power conditions, the controller 304 controls the fuel 67 split into the pilot mixer 214 and the main mixer 216 (e.g., the percentage of the fuel 67 that is split between the pilot mixer 214 and the main mixer 216). For example, the controller 304 controls the amount of the pilot fuel stream 226 into the pilot mixer 214 and controls the amount of the main fuel stream 234 into the main mixer 216. The controller 304 also controls the compressed air 65 split into the pilot mixer 214 and the main mixer 216 (e.g., the percentage of the compressed air 65 that is split between the pilot mixer 214 and the main mixer 216). For example, the controller 304 controls the amount of the first portion 228 of the compressed air 65 into the pilot mixer 214 and controls the amount of the second portion 236 of the compressed air 65 into the main mixer 216. The main fuel stream 234 is mixed with the second portion 236 of the compressed air 65 to provide a lean fuel-air mixture that is ignited to generate the main flame 238 within the region 240. Thus, when the main mixer 216 is operating, the fuel-air ratio in the main mixer 216 is fuel lean (e.g., lower fuel-air ratio) and is more fuel lean than the fuel-air ratio in the pilot mixer 214.

As detailed above, during a high power operation, it is difficult to control the fuel-air split between the pilot mixer 214 and the main mixer 216 to balance a reduction in NO), emissions, a reduction in nvPM emissions, a reduction in fuel burn, and an increase in thermal efficiency. Further, during a high power operation, the temperature in the combustion chamber 202 is increased, thereby producing increased $NO_x$ emissions and increased nvPM emissions. Thus, in step 425, the controller 304 controls the injection of fluid into the combustion chamber 202 to inject fluid during high power operation. For example, the controller 304 controls the fluid injector 296 to inject the fluid into the mixer assembly 212. In some embodiments, the controller 304 controls the pump 294 to pump the fluid from the fluid supply 292 through the mixer assembly 212 and into the combustion chamber 202 to inject the fluid. The fluid reduces the temperature in the combustion chamber 202 to reduce the $NO_x$ emissions and to reduce the nvPM emissions during high power operation (e.g., takeoff conditions and/or climb conditions) of the turbine engine 10 (FIG. 1).

In step 430, if the turbine engine 10 is not in a high power operation (step 415: No), the controller 304 shuts off the fluid injection. In step 435, the controller 304 determines whether the turbine engine 10 (FIG. 1) is in mid-level power operation based on the power, on the pressure, on the temperature, and/or on the fuel-air ratio. Mid-level power operation, mid-level pressures, mid-level temperatures, and mid-level fuel-air ratios indicate a cruise condition of the mission cycle of the turbine engine 10 (FIG. 1).

In step 440, if the turbine engine 10 (FIG. 1) is in mid-level power operation, (step 435: Yes), the controller 304 operates the pilot mixer 214 and the main mixer 216. At mid-level power conditions, the controller 304 controls the fuel 67 split into the pilot mixer 214 and the main mixer 216. For example, the controller 304 controls the amount of the pilot fuel stream 226 into the pilot mixer 214 and controls the amount of the main fuel stream 234 into the main mixer 216. The controller 304 also controls the compressed air 65 split into the pilot mixer 214 and the main mixer 216 during the mid-level power operation. For example, the controller 304 controls the amount of the first portion 228 of the compressed air 65 into the pilot mixer 214 and controls the amount of the second portion 236 of the compressed air 65 into the main mixer 216. During the mid-level power operation, the controller 304 controls the fuel 67 split and/or the compressed air 65 split into the pilot mixer 214 and the main mixer 216 differently than the fuel 67 split and/or the compressed air 65 split during the high power operation. For example, during the mid-level power operation, the controller 304 controls the percentage of the fuel 67 and/or the compressed air 65 that is split between the pilot mixer 214 and the main mixer 216 at different percentages than the fuel 67 split and/or the compressed air 65 split during the high power operation.

In step 445, if the turbine engine 10 (FIG. 1) is not in mid-level power operation (step 435: No), the controller 304 determines whether the turbine engine 10 (FIG. 1) is in low power operation based on the power, on the pressure, on the temperature, and/or on the fuel-air ratio. Low power operation, low pressure, low temperature, and/or low fuel-air ratio indicate an engine startup condition, an idle condition, a taxiing condition, and/or a descent condition of the mission cycle.

In step 450, if the turbine engine 10 (FIG. 1) is in low power operation (step 445: Yes), the controller 304 shuts off the fuel 67 flow to the main mixer 216 and operates only the pilot mixer 214. For example, during engine start conditions, idle conditions, taxiing conditions, and/or descent conditions of the turbine engine 10 (FIG. 1), the fluid injection is not needed to reduce the $NO_x$ emissions and to reduce the nvPM emissions due to the lower temperatures associated with using only the pilot mixer 214. For example, the small, fuel rich, pilot flame 230 operates with a lesser amount of the fuel 67 than the amount of the fuel 67 that is used during the high power operation when both the pilot mixer 214 and the main mixer 216 are operating. Operating only the pilot mixer 214 during low power operation reduces the $NO_x$ emissions and reduces the nvPM emissions due to the lower temperatures associated with using only the pilot mixer 214 due to the lesser amount of fuel 67 being used.

If the turbine engine 10 (FIG. 1) is not in low power operation, the method 400 repeats from step 405. Thus, the controller 304 determines whether the turbine engine 10 (FIG. 1) is operating in high power operation, mid-level power operation, or low power operation, and operates the fuel injector 218 and the fluid injector 296 accordingly. In this way, the controller 304 operates the pilot mixer 214 and the main mixer 216 and the fluid injector 296 during high power operation (e.g., takeoff and climb). The controller 304 shuts off the fluid injector 296 and operates the pilot mixer 214 and the main mixer 216 during mid-level power operation (e.g., cruise). The controller 304 shuts off the fluid injector 296 and shuts off the main mixer 216 and operates only the pilot mixer 214 during low power operation (e.g., engine start, idle, taxiing, descent). Accordingly, the fluid injection system 290 injects fluid during high power operation, and does not inject fluid during mid-level power operation or during low power operation. Thus, the method 400 provides for a reduction of $NO_x$ emissions and nvPM emissions over an entirety of the mission cycle of the turbine engine 10 (FIG. 1) even during the high power conditions in which the temperature in the combustion chamber 202 is typically higher due to the additional fuel 67 during such conditions.

In some embodiments, the controller 304 controls a fuel 67 split (e.g., a percentage of the fuel 67 entering the pilot mixer 214 and the entering the main mixer 216) between the pilot mixer 214 and the main mixer 216 based on the operating conditions of the combustion gases 66. For example, the controller 304 receives the one or more second sensor signals 314 from the one or more second sensors 280 and controls the fuel 67 split between the pilot mixer 214 and the main mixer 216 during the high power operation while the fluid is injected into the combustor 200 to maintain the operating conditions of the combustion gases 66 at predetermined operating conditions. In this way, the controller 304 controls an amount of fuel 67 into the pilot mixer 214 and an amount of fuel 67 into the main mixer 216. In one embodiment, the operating conditions of the combustion gases 66 include a temperature of the combustion gases 66. For example, the controller 304 receives the signal indicative of temperature of the combustion gases 66 from the second temperature sensor 284. In this way, the fluid injection allows for the controller 304 to control the fuel 67 split between the pilot mixer 214 and the main mixer 216 during high power operation to reduce fuel burn while maintaining the temperature of the combustion gases 66 and reducing $NO_x$ emissions and nvPM emissions.

In some embodiments, the controller 304 controls the compressed air 65 split (e.g., a percentage of the compressed air 65 entering the pilot mixer 214 and entering the main mixer 216) between the pilot mixer 214 and the main mixer 216 based on the operating conditions of the combustion gases 66. For example, the controller 304 controls the compressed air 65 split between the pilot mixer 214 and the main mixer 216 during the high power operation while the fluid is injected into the combustor 200 to maintain the operating conditions of the combustion gases 66 at predetermined operating conditions. In this way, the controller 304 controls an amount of compressed air 65 into the pilot mixer 214 and an amount of compressed air 65 into the main mixer 216. In some embodiments, the operating conditions of the combustion gases 66 include a temperature of the combustion gases 66. In this way, the fluid injection allows for the controller 304 to control the compressed air 65 split between the pilot mixer 214 and the main mixer 216 during the high power operation to reduce fuel burn while maintaining the temperature of the combustion gases 66 and reducing $NO_x$ emissions and nvPM emissions.

Embodiments of the present disclosure provide systems and methods to balance the requirements in turbine engines of low fuel burn and CO 2 emissions that are achieved with high overall pressure ratios and combustor fuel-air ratios, and other pollutant emissions, such as $NO_x$ emissions, that increase with temperature increases and pressure increases. Embodiments of the present disclosure utilize fluid injection into the combustor during high power operation to reduce $NO_x$ emissions, while also utilizing a lean burn staged combustion system during low power operation or during mid-level power operation that can provide low fuel burn and low emissions across the entire mission cycle of the turbine engine. The fluid injection reduces NO), emissions near the ground, and fuel staging (e.g., the split of fuel and/or of air between the pilot mixer and the main mixer) reduces both $NO_x$ emissions and nvPM emissions at cruise and other low power operation. Further, the embodiments disclosed herein provide for improving air flow and fuel flow splits between the main mixer and the pilot mixer when the fluid is injected, while allowing for reduced fuel burn, reduced $NO_x$ emissions, reduced nvPM emissions, and operating at higher OPRs and fuel-air ratios over an entirety of the mission cycle for the turbine engine.

Further aspects are provided by the subject matter of the following clauses.

A combustor for a turbine engine comprises a fuel injector having a mixer assembly with a pilot mixer and a main mixer, the pilot mixer and the main mixer operating during a high power operation of the turbine engine, and a fluid injection system in fluid communication with the combustor, the fluid injection system injecting a fluid into the combustor during the high power operation of the turbine engine, the fluid being shut off during a low power operation of the turbine engine and during a mid-level power operation of the turbine engine.

The combustor of the preceding clause, the main mixer being shut off during the low power operation of the turbine engine.

The combustor of any preceding clause, the fluid injection system comprising a fluid supply and a pump, the pump operating to pump the fluid from the fluid supply into the combustor.

The combustor of any preceding clause, the high power operation being during a takeoff condition or a climb condition of the turbine engine, the mid-level power operation being during a cruise condition of the turbine engine, and the low power operation being during an engine start condition, an idle condition, a taxiing condition, or a descent condition of the turbine engine.

The combustor of any preceding clause, further comprising an igniter that ignites a rich fuel-air mixture from the pilot mixer to generate a pilot flame in the combustor, and ignites a lean fuel-air mixture from the main mixer to generate a main flame in the combustor.

The combustor of any preceding clause, further comprising one or more first sensors that sense operating conditions of compressed air entering the mixer assembly, the pilot mixer and the main mixer being operated based on the operating conditions of the compressed air.

The combustor of any preceding clause, further comprising one or more second sensors that sense operating conditions of combustion gases exiting the combustor, the mixer assembly controlling a fuel split between the pilot mixer and the main mixer based on the operating conditions of the combustion gases.

The combustor of any preceding clause, further comprising one or more second sensors that sense operating conditions of combustion gases exiting the combustor, the mixer assembly controlling a compressed air split between the pilot mixer and the main mixer based on the operating conditions of the combustion gases.

The combustor of any preceding clause, the pilot mixer and the main mixer operating during the mid-level power operation of the turbine engine.

The combustor of any preceding clause, the fluid being water or steam.

The combustor of any preceding clause, the fluid injection system injecting fluid upstream of the combustor.

The combustor of any preceding clause, the fluid injection system injecting fluid upstream of an annular dome of the combustor.

The combustor of any preceding clause, the fluid injection system injecting fluid into the mixer assembly.

The combustor of any preceding clause, the fluid injection system injecting fluid into swirler passages of the mixer assembly.

The combustor of any preceding clause, the fluid injection system further comprising a fluid injector for injecting the fluid into the combustor.

The combustor of any preceding clause, the fluid injector comprising at least one of a spray bar or a manifold for injecting the fluid.

The combustor of any preceding clause, the fluid injector being located to inject the fluid upstream of an annular dome of the combustor.

The combustor of any preceding clause, the fluid injector being located within swirler passages of the pilot mixer or within swirler passages of the main mixer.

The combustor of any preceding clause, further comprising a controller that controls the pilot mixer, the main mixer, and the fluid injection system.

The combustor of any preceding clause, a fuel flow to the pilot mixer being reduced during the low power operation.

The combustor of any preceding clause, the rich fuel-air mixture having a greater fuel-air ratio than the lean fuel-air mixture.

The combustor of any preceding clause, the fluid supply being from at least one of environmental capture, exhaust capture, a tank that stores the fluid, or a fluid supply from an aircraft.

The combustor of any preceding clause, nitrogen oxide ($NO_x$) emissions and non-volatile particulate matter (nvPM) being reduced over an entirety of the high power operation and the low power operation.

The combustor of any preceding clause, the combustor being a lean burn combustor.

The combustor of any preceding clause, the pilot mixer mixing a pilot fuel stream and a first portion of compressed air to generate the rich fuel-air mixture.

The combustor of any preceding clause, the main mixer mixing a main fuel stream and a second portion of the compressed air to generate the lean fuel-air mixture.

The combustor of any preceding clause, the controller controlling an amount of the pilot fuel stream and an amount of the first portion of compressed air into the pilot mixer.

The combustor of any preceding clause, the controller controlling an amount of the main fuel stream and an amount of the second portion of compressed air into the main mixer.

The combustor of any preceding clause, the high power operation being greater than 85% of a sea level static (SLS) maximum engine rated thrust of the turbine engine.

The combustor of any preceding clause, the mod-level power operation being between 30% and 85% of the SLS maximum engine rated thrust of the turbine engine.

The combustor of any preceding clause, the low power operation being less than 30% of the SLS maximum engine rated thrust of the turbine engine.

A method of operating a combustor for a turbine engine comprises operating a pilot mixer and a main mixer of a mixer assembly of the combustor during a high power operation of the turbine engine, injecting a fluid into the combustor during the high power operation, and shutting off the fluid during a low power operation of the turbine engine and during a mid-level power operation of the turbine engine.

The method of the preceding clause, operating the pilot mixer including generating a pilot flame with a rich fuel-air mixture and operating the main mixer includes generating a main flame with a lean fuel-air mixture.

The method of any preceding clause, further comprising shutting off the main mixer and operating only the pilot mixer during the low power operation of the turbine engine.

The method of any preceding clause, further comprising controlling a fuel split between the pilot mixer and the main mixer during high power operation while the fluid is injected into the combustor to maintain operating conditions of combustion gases at predetermined operating conditions.

The method of any preceding clause, further comprising controlling a compressed air split between the pilot mixer and the main mixer during the high power operation while the fluid is injected into the combustor to maintain operating conditions of combustion gases at predetermined operating conditions.

The method of any preceding clause, further comprising determining whether the turbine engine is operating at the high power operation based on operating conditions of compressed air entering the mixer assembly.

The method of any preceding clause, injecting fluid into the combustor comprising pumping the fluid from a fluid supply into the combustor.

The method of any preceding clause, further comprising operating the pilot mixer and the main mixer during the mid-level power operation of the turbine engine.

The method of any preceding clause, high power operation being during a takeoff condition or a climb condition of the turbine engine, the mid-level power operation being during a cruise condition of the turbine engine, and the low power operation being during an engine start condition, an idle condition, a taxiing condition, or a descent condition of the turbine engine.

The method of any preceding clause, the fluid being water or steam.

The method of any preceding clause, further comprising injecting fluid upstream of the combustor.

The method of any preceding clause, further comprising injecting the fluid upstream of an annular dome of the combustor.

The method of any preceding clause, further comprising injecting fluid into the mixer assembly.

The method of any preceding clause, further comprising injecting fluid into swirler passages of the mixer assembly.

The method of any preceding clause, further comprising injecting the fluid into the combustor by a fluid injector.

The method of any preceding clause, the fluid injector comprising at least one of a spray bar or a manifold for injecting the fluid.

The method of any preceding clause, the fluid injector being located to inject the fluid upstream of an annular dome of the combustor.

The method of any preceding clause, the fluid injector being located within swirler passages of the pilot mixer or within swirler passages of the main mixer.

The method of any preceding clause, further comprising reducing a fuel flow to the pilot mixer during the low power operation.

The method of any preceding clause, the rich fuel-air mixture having a greater fuel-air ratio than the lean fuel-air mixture.

The method of any preceding clause, the fluid supply being from at least one of environmental capture, exhaust capture, a tank that stores the fluid, or a fluid supply from an aircraft.

The method of any preceding clause, further comprising injecting the fluid reducing nitrogen oxide ($NO_x$) emissions and non-volatile particulate matter (nvPM) emissions during the high power operation.

The method of any preceding clause, further comprising operating the pilot mixer during the low power operation reducing the $NO_x$ emissions and the nvPM emissions during the low power operation.

The method of any preceding clause, the combustor being a lean burn combustor.

The method of any preceding clause, further comprising mixing a pilot fuel stream and a first portion of compressed air in the pilot mixer to generate the rich fuel-air mixture.

The method of any preceding clause, further comprising mixing a main fuel stream and a second portion of the compressed air in the main mixer to generate the lean fuel-air mixture.

The method of any preceding clause, further comprising controlling an amount of the pilot fuel stream and an amount of the first portion of compressed air into the pilot mixer.

The method of any preceding clause, further comprising controlling an amount of the main fuel stream and an amount of the second portion of compressed air into the main mixer.

The method of any preceding clause, the high power operation being greater than 85% of a sea level static (SLS) maximum engine rated thrust of the turbine engine.

The method of any preceding clause, the mod-level power operation being between 30% and 85% of the SLS maximum engine rated thrust of the turbine engine.

The method of any preceding clause, the low power operation being less than 30% of the SLS maximum engine rated thrust of the turbine engine.

A turbine engine comprises a combustor comprising a fuel injector having a mixer assembly with a pilot mixer and a main mixer, the pilot mixer and the main mixer operating during a high power operation of the turbine engine, and a fluid injection system in fluid communication with the combustor, the fluid injection system injecting a fluid into the combustor during the high power operation of the turbine engine, the fluid being shut off during a low power operation of the turbine engine and during a mid-level power operation of the turbine engine.

The turbine engine of the preceding clause, the main mixer being shut off during the low power operation of the turbine engine.

The turbine engine of any preceding clause, the fluid injection system comprising a fluid supply and a pump, the pump operating to pump the fluid from the fluid supply into the combustor.

The turbine engine of any preceding clause, further comprising an igniter that ignites a rich fuel-air mixture from the pilot mixer to generate a pilot flame in the combustor, and ignites a lean fuel-air mixture from the main mixer to generate a main flame in the combustor.

The turbine engine of any preceding clause, further comprising one or more first sensors that sense operating conditions of compressed air entering the mixer assembly, the pilot mixer and the main mixer being operated based on the operating conditions of the compressed air.

The turbine engine of any preceding clause, further comprising one or more second sensors that sense operating conditions of combustion gases exiting the combustor, the mixer assembly controlling a fuel split between the pilot mixer and the main mixer based on the operating conditions of the combustion gases.

The turbine engine of any preceding clause, the pilot mixer and the main mixer operating during the mid-level power operation of the turbine engine.

The turbine engine of any preceding clause, further comprising one or more second sensors that sense operating conditions of combustion gases exiting the combustor, the mixer assembly controlling a compressed air split between the pilot mixer and the main mixer based on the operating conditions of the combustion gases.

The turbine engine of any preceding clause, the high power operation being during a takeoff condition or a climb condition of the turbine engine, the mid-level power operation being during a cruise condition of the turbine engine, and the low power operation being during an engine start condition, an idle condition, a taxiing condition, or a descent condition of the turbine engine.

The turbine engine of any preceding clause, the fluid being water or steam.

The turbine engine of any preceding clause, the fluid injection system injecting fluid upstream of the combustor.

The turbine engine of any preceding clause, the fluid injection system injecting fluid upstream of an annular dome of the combustor.

The turbine engine of any preceding clause, the fluid injection system injecting fluid into the mixer assembly.

The turbine engine of any preceding clause, the fluid injection system injecting fluid into swirler passages of the mixer assembly.

The turbine engine of any preceding clause, the fluid injection system further comprising a fluid injector for injecting the fluid into the combustor.

The turbine engine of any preceding clause, the fluid injector comprising at least one of a spray bar or a manifold for injecting the fluid.

The turbine engine of any preceding clause, the fluid injector being located to inject the fluid upstream of an annular dome of the combustor.

The turbine engine of any preceding clause, the fluid injector being located within swirler passages of the pilot mixer or within swirler passages of the main mixer.

The turbine engine of any preceding clause, further comprising a controller that controls the pilot mixer, the main mixer, and the fluid injection system.

The turbine engine of any preceding clause, a fuel flow to the pilot mixer being reduced during the low power operation.

The turbine engine of any preceding clause, the rich fuel-air mixture having a greater fuel-air ratio than the lean fuel-air mixture.

The turbine engine of any preceding clause, the fluid supply being from at least one of environmental capture, exhaust capture, a tank that stores the fluid, or a fluid supply from an aircraft.

The turbine engine of any preceding clause, nitrogen oxide ($NO_x$) emissions and non-volatile particulate matter (nvPM) being reduced over an entirety of the high power operation and the low power operation.

The turbine engine of any preceding clause, the combustor being a lean burn combustor.

The turbine engine of any preceding clause, the pilot mixer mixing a pilot fuel stream and a first portion of compressed air to generate the rich fuel-air mixture.

The turbine engine of any preceding clause, the main mixer mixing a main fuel stream and a second portion of the compressed air to generate the lean fuel-air mixture.

The turbine engine of any preceding clause, the controller controlling an amount of the pilot fuel stream and an amount of the first portion of compressed air into the pilot mixer.

The turbine engine of any preceding clause, the controller controlling an amount of the main fuel stream and an amount of the second portion of compressed air into the main mixer.

The turbine engine of any preceding clause, the high power operation being greater than 85% of a sea level static (SLS) maximum engine rated thrust of the turbine engine.

The turbine engine of any preceding clause, the mod-level power operation being between 30% and 85% of the SLS maximum engine rated thrust of the turbine engine.

The turbine engine of any preceding clause, the low power operation being less than 30% of the SLS maximum engine rated thrust of the turbine engine.

A fluid injection control system for a turbine engine, the fluid injection control system comprising a combustor, a fluid injection system in fluid communication with the combustor, and a controller. The combustor comprises a fuel injector having a mixer assembly with a pilot mixer and a main mixer. The controller operates the pilot mixer and the main mixer during high power operation of the turbine engine, controls the fluid injection system to inject fluid into the combustor during the high power operation, and controls the fluid injection system to shut off the fluid during low power operation and during mid-level power operation of the turbine engine.

The fluid injection control system of the preceding clause, the controller shutting off the main mixer during the low power operation of the turbine engine.

The fluid injection control system of any preceding clause, the controller operating the pilot mixer and the main mixer during the mid-level power operation of the turbine engine.

The fluid injection control system of any preceding clause, operating the pilot mixer including the controller generating a pilot flame with a rich fuel-air mixture.

The fluid injection control system of any preceding clause, operating the main mixer including the controller generating a main flame with a lean fuel-air mixture.

The fluid injection control system of any preceding clause, the controller further controlling a fuel split between the pilot mixer and the main mixer during high power operation while the fluid is injected into the combustor to maintain operating conditions of combustion gases at predetermined operating conditions.

The fluid injection control system of any preceding clause, the controller further controlling a compressed air split between the pilot mixer and the main mixer during high power operation while the fluid is injected into the combustor to maintain operating conditions of combustion gases at predetermined operating conditions.

The fluid injection control system of any preceding clause, the controller further determining whether the turbine engine is operating at high power operation based on operating conditions of compressed air entering the mixer assembly.

The fluid injection control system of any preceding clause, the fluid injection system further comprising a fluid supply and a pump, the controller controlling the pump to pump the fluid from a fluid supply into the combustor.

The fluid injection control system of any preceding clause, high power operation being during a takeoff condition or a climb condition of the turbine engine, the mid-level power operation being during a cruise condition of the turbine engine, and the low power operation being during an engine start condition, an idle condition, a taxiing condition, or a descent condition of the turbine engine.

The fluid injection control system of any preceding clause, the fluid being water or steam.

The fluid injection control system of any preceding clause, further comprising the controller controlling the fluid injection system to inject the fluid upstream of the combustor.

The combustor of any preceding clause, further comprising the controller controlling the fluid injection system to inject fluid upstream of an annular dome of the combustor.

The fluid injection control system of any preceding clause, further comprising the controller controlling the fluid injection system to inject fluid into the mixer assembly.

The fluid injection control system of any preceding clause, further comprising the controller controlling the fluid injection system to inject fluid into swirler passages of the mixer assembly.

The fluid injection control system of any preceding clause, the fluid injection system further comprising a fluid injector for injecting the fluid into the combustor.

The fluid injection control system of any preceding clause, the fluid injector comprising at least one of a spray bar or a manifold for injecting the fluid.

The fluid injection control system of any preceding clause, the fluid injector being located to inject the fluid upstream of an annular dome of the combustor.

The fluid injection control system of any preceding clause, the fluid injector being located within swirler passages of the pilot mixer or within swirler passages of the main mixer.

The fluid injection control system of any preceding clause, further comprising the controller reducing a fuel flow to the pilot mixer during the low power operation.

The fluid injection control system of any preceding clause, the rich fuel-air mixture having a greater fuel-air ratio than the lean fuel-air mixture.

The fluid injection control system of any preceding clause, the fluid supply being from at least one of environmental capture, exhaust capture, a tank that stores the fluid, or a fluid supply from an aircraft.

The fluid injection control system of any preceding clause, injecting the fluid reducing nitrogen oxide ($NO_x$) emissions and non-volatile particulate matter (nvPM) emissions during the high power operation.

The fluid injection control system of any preceding clause, the controller operating the pilot mixer during the low power operation reduces the $NO_x$ emissions and the nvPM emissions during the low power operation.

The fluid injection control system of any preceding clause, the combustor being a lean burn combustor.

The fluid injection control system of any preceding clause, further comprising the controller mixing a pilot fuel stream and a first portion of compressed air in the pilot mixer to generate the rich fuel-air mixture.

The fluid injection control system of any preceding clause, further comprising the controller mixing a main fuel stream and a second portion of the compressed air in the main mixer to generate the lean fuel-air mixture.

The fluid injection control system of any preceding clause, further comprising the controller controlling an amount of the pilot fuel stream and an amount of the first portion of compressed air into the pilot mixer.

The fluid injection control system of any preceding clause, further comprising the controller controlling an amount of the main fuel stream and an amount of the second portion of the compressed air into the main mixer.

The fluid injection control system of any preceding clause, the high power operation being greater than 85% of a sea level static (SLS) maximum engine rated thrust of the turbine engine.

The fluid injection control system of any preceding clause, the mod-level power operation being between 30% and 85% of the SLS maximum engine rated thrust of the turbine engine.

The fluid injection control system of any preceding clause, the low power operation being less than 30% of the SLS maximum engine rated thrust of the turbine engine.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A combustor for a turbine engine, the combustor comprising:
   a fuel injector having a mixer assembly with a pilot mixer and a main mixer, the fuel injector injecting fuel through the pilot mixer to generate a pilot fuel stream and through the main mixer to generate a main fuel stream;
   a fluid injection system in fluid communication with the combustor, the fluid injection system injecting a fluid into the combustor; and
   a controller that is communicatively coupled to the fuel injector and the fluid injection system, wherein the controller:
      controls the fuel injector to inject the pilot fuel stream through the pilot mixer and the main fuel stream through the main mixer during a high power operation of the turbine engine;
      controls the fluid injection system to inject the fluid into the combustor during the high power operation; and
      controls the fluid injection system to shut off the fluid into the combustor during an entirety of a low power operation of the turbine engine and during an entirety of a mid-level power operation of the turbine engine,
   wherein the low power operation is less than 30% of a maximum rated thrust of the turbine engine, the mid-level power operation is 30% to 85% of the maximum rated thrust of the turbine engine, and the high power operation is greater than 85% of the maximum rated thrust of the turbine engine.

2. The combustor of claim 1, wherein the controller controls the fuel injector to shut off the main fuel stream through the main mixer during the low power operation of the turbine engine.

3. The combustor of claim 1, wherein the fluid injection system comprises a fluid supply and a pump, and the controller controls the pump to pump the fluid from the fluid supply into the combustor.

4. The combustor of claim 1, wherein the high power operation is during a takeoff condition or a climb condition of the turbine engine, the mid-level power operation is during a cruise condition of the turbine engine, and the low power operation is during an engine start condition, an idle condition, a taxiing condition, or a descent condition of the turbine engine.

5. The combustor of claim 1, further comprising an igniter that ignites a rich fuel-air mixture from the pilot mixer to generate a pilot flame in the combustor, and ignites a lean fuel-air mixture from the main mixer to generate a main flame in the combustor.

6. The combustor of claim 1, further comprising one or more first sensors that sense operating conditions of compressed air entering the mixer assembly, and the controller controls the fuel injector to inject the pilot fuel stream through the pilot mixer and the main fuel stream through the main mixer based on the operating conditions of the compressed air.

7. The combustor of claim 6, further comprising one or more second sensors that sense operating conditions of combustion gases exiting the combustor, wherein the controller controls a fuel split between the pilot mixer and the main mixer based on the operating conditions of the combustion gases.

8. The combustor of claim 6, further comprising one or more second sensors that sense operating conditions of combustion gases exiting the combustor, wherein the controller controls a compressed air split between the pilot mixer and the main mixer based on the operating conditions of the combustion gases.

9. A turbine engine comprising:
   a combustor comprising a fuel injector having a mixer assembly with a pilot mixer and a main mixer, the fuel injector injecting fuel through the pilot mixer to generate a pilot fuel stream and through the main mixer to generate a main fuel stream;
   a fluid injection system in fluid communication with the combustor, the fluid injection system injecting a fluid into the combustor; and
   a controller that is communicatively coupled to the fuel injector and the fluid injection system, wherein the controller:
      controls the fuel injector to inject the pilot fuel stream through the pilot mixer and the main fuel stream through the main mixer during a high power operation of the turbine engine;
      controls the fluid injection system to inject the fluid into the combustor during the high power operation; and
      controls the fluid injection system to shut off the fluid into the combustor during an entirety of a low power operation of the turbine engine and during an entirety of a mid-level power operation of the turbine engine,
      wherein the low power operation is less than 30% of a maximum rated thrust of the turbine engine, the mid-level power operation is 30% to 85% of the maximum rated thrust of the turbine engine, and the high power operation is greater than 85% of the maximum rated thrust of the turbine engine.

10. The turbine engine of claim 9, wherein the controller controls the fuel injector to shut off the main fuel stream through the main mixer during the low power operation of the turbine engine.

11. The turbine engine of claim 9, wherein the fluid injection system comprises a fluid supply and a pump, and the controller controls the pump to pump the fluid from the fluid supply into the combustor.

12. The turbine engine of claim 9, further comprising an igniter that ignites a rich fuel-air mixture from the pilot mixer to generate a pilot flame in the combustor, and ignites a lean fuel-air mixture from the main mixer to generate a main flame in the combustor.

13. The turbine engine of claim 9, further comprising one or more first sensors that sense operating conditions of compressed air entering the mixer assembly, and the controller controls the fuel injector to inject the pilot fuel stream through the pilot mixer and the main fuel stream through the main mixer based on the operating conditions of the compressed air.

14. The turbine engine of claim 13, further comprising one or more second sensors that sense operating conditions of combustion gases exiting the combustor, wherein the controller controls a fuel split between the pilot mixer and the main mixer based on the operating conditions of the combustion gases.

15. The turbine engine of claim 13, further comprising one or more second sensors that sense operating conditions of combustion gases exiting the combustor, wherein the controller controls a compressed air split between the pilot mixer and the main mixer based on the operating conditions of the combustion gases.

16. The turbine engine of claim 9, wherein the high power operation is during a takeoff condition or a climb condition of the turbine engine, the mid-level power operation is during a cruise condition of the turbine engine, and the low power operation is during an engine start condition, an idle condition, a taxiing condition, or a descent condition of the turbine engine.

* * * * *